US008325063B2

(12) United States Patent
Dasgupta

(10) Patent No.: US 8,325,063 B2
(45) Date of Patent: *Dec. 4, 2012

(54) SYSTEMS AND METHODS FOR RECORDING PARKING SPACE INFORMATION

(75) Inventor: Sudeep Dasgupta, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,597

(22) Filed: Jun. 6, 2011

(65) Prior Publication Data

US 2011/0238464 A1 Sep. 29, 2011

Related U.S. Application Data

(63) Continuation of application No. 12/250,729, filed on Oct. 14, 2008, now Pat. No. 8,004,426.

(51) Int. Cl.
*B60Q 1/48* (2006.01)
*G08G 1/14* (2006.01)

(52) U.S. Cl. ..................................... 340/932.2; 340/933

(58) Field of Classification Search ................ 340/932.2
See application file for complete search history.

(56) References Cited

U.S. PATENT DOCUMENTS

| | | | | |
|---|---|---|---|---|
| 6,816,083 | B2 | 11/2004 | Brandt | |
| 7,027,808 | B2 * | 4/2006 | Wesby | 455/419 |
| 7,411,518 | B2 | 8/2008 | Ratnakar | |
| 8,004,426 | B2 * | 8/2011 | Dasgupta | 340/932.2 |
| 2002/0163443 | A1 | 11/2002 | Stewart et al. | |
| 2004/0068433 | A1 | 4/2004 | Chatterjee et al. | |
| 2004/0212519 | A1 | 10/2004 | Nelson et al. | |
| 2005/0228583 | A1 | 10/2005 | Capuano | |
| 2005/0280555 | A1 * | 12/2005 | Warner | 340/932.2 |
| 2006/0212344 | A1 | 9/2006 | Marcus et al. | |
| 2007/0247333 | A1 | 10/2007 | Borean et al. | |

* cited by examiner

*Primary Examiner* — Travis Hunnings

(57) ABSTRACT

A system and method for recording data associated with a parking space. The data may be received a portable electronic device, such as a cell phone. The data may be received from a computer readable medium associated with the parking space, such as a bar code. The data may also be received from a wireless signal associated with the parking space, such as a Bluetooth wireless signal. The data may contain such information as the location of the parking space within the parking area. Other information may be included in the data, such as parking rate information for the parking space. A feature may included wherein the data may be transmitted to a server wherein the data may be stored in a storage device. The system and method may also allow payment for the parking space using the personal electronic device and the server.

18 Claims, 7 Drawing Sheets

202

42000 06200

FIG. 2A

204

FIG. 2B

206

10005

FIG. 2C

SYSTEMS AND METHODS FOR RECORDING PARKING SPACE INFORMATION

BACKGROUND INFORMATION

This patent application is a continuation (CON) of U.S. patent application Ser. No. 12/250,729, entitled "Systems And Methods For Recording Parking Space Information," filed on Oct. 14, 2008, which is hereby incorporated by reference herein in its entirety.

Automobiles provide transportation for many people. Because of the use of automobiles for transportation, parking is needed at many places where people may visit to conduct business, such as office buildings, businesses, shopping malls, and transportation hubs, such as airports. Parking is generally provided at these places in the form of a parking area or a parking lot. Some streets also have parking areas, typically in the form of parking spaces along the side of the street. The parking area or lot can be of varying size, ranging from a few parking spaces to thousands of spaces. The parking lot may span a single level or multiple levels, both above and below ground, such as a parking garage. Finding a parking space in a large parking lot can be frustrating and take time, particularly if the parking lot is very large and located at a popular area with a high traffic volume, i.e., a lot of automobiles. Finding parking on a street, especially in a busy area, can also be particularly difficult. Indeed, many times parking can only be found at a significant distance from a person's destination. Therefore, remembering where one's automobile is parked can be a daunting task, especially if one's automobile is parked in a very large lot, e.g., at an airport. This problem may be compounded if the automobile is in a parking the parking area for an extended period of time, i.e., a person parks an automobile and leaves on a trip.

Further, parking lots may charge money for parking. Payment in large parking lots, such as parking garage or a surface lot an airport, may be completed by paying an attendant in a booth at an exit of the parking lot. Completing the payment can take time, especially in large parking lots, since a bottleneck may form at the exit, if, for example, only a few payment booths are available and many automobiles are attempting to exit concurrently.

Street parking and some parking lots may use meters to collect payment. The meter may only allow payment for a limited amount of time based on prevailing parking regulations for the area, e.g., 2 hours maximum. In order to extend the time past the designated limit, an individual must physically go to the meter and redeposit the appropriate amount. Many street parking spaces now use centralized meters that allow the use of a credit card to pay, however the same limitations regarding parking time may still exist.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIGS. 2A-2C depict various types of barcodes in accordance with an exemplary embodiment;

Figure 1A:
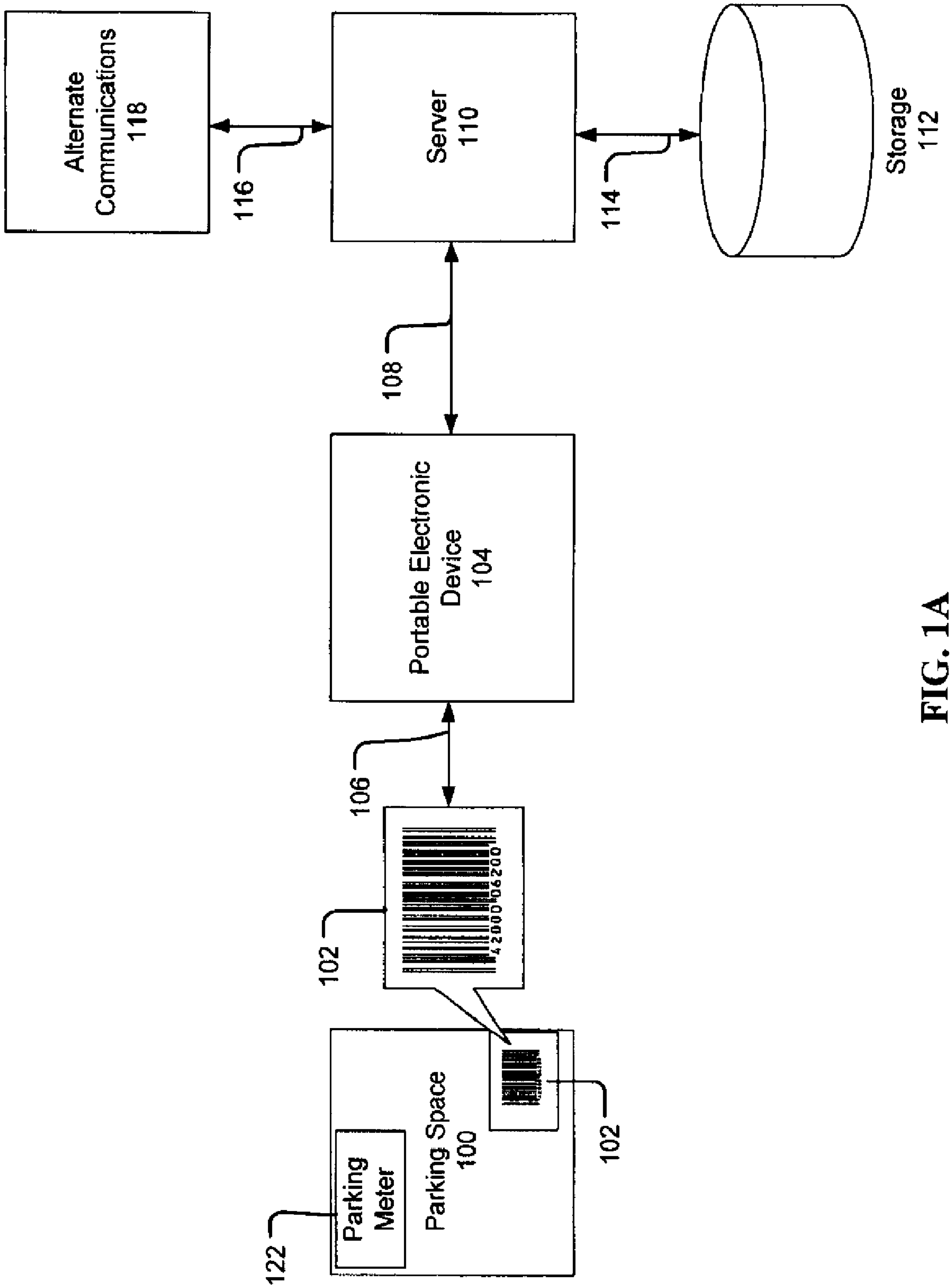
FIG. 1A depicts a block diagram of a system architecture for receiving and processing the location of a parking space in accordance with an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

Exemplary embodiments may provide a system and method for receiving encoded data associated with a parking space on a portable electronic device. The portable electronic device may perform processing, decoding, display, and storage of the encoded data. In some embodiments, the system and method may further include transmitting the received data to a server for storage in the event of a failure of the portable electronic device. Further, the system and method may also include use of the portable electronic device to pay for the parking space.

The description below describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, etc.) separately. The functions described as being performed at various components may be performed at other components, and the various components may be combined and/or separated. Other modifications also may be made.

A method in accordance with exemplary embodiments may allow a portable electronic device to obtain, process, display, and record encoded data associated with a parking space from a computer readable media, such as a bar code, affixed to or near the parking space. The computer readable media may be of a suitable form which may be capable of containing the encoded data. The data contained on the computer readable media may include the location of the parking space within a parking area. Other data may be included, such as parking rate information and the physical address of the parking area. The location of the parking space may consist of such data to allow the person to find their automobile, such as a number associated with a parking space or the level and row location of the parking space. The received data may be processed by the portable electronic device. The processing by the portable electronic device may include decoding the data into a human-readable form, such as text or graphics. The decoded data may be displayed on the portable electronic device. The decoded data may further be stored by the portable electronic device.

The portable electronic device may receive the data through various inputs, such as by using an optical imaging device, such as a digital camera or a scanner. The optical imaging device may be contained within or associated with the portable electronic device. In some embodiments, the data may be received through the use of an RFID chip, in place of or in conjunction with the optical imaging device. The data may also be received over a wireless signal broadcast from a wireless server associated with a parking space.

Both the received data and the processed data may be stored on the portable electronic device. The stored data may be retrieved by a person operating the portable electronic device. The retrieved data may then be displayed on the portable electronic device. Previous data for a parking space may also be erased from storage on the portable electronic device.

A server with associated storage may be provided. The server may be communicatively coupled with the portable electronic device. The encoded data from the parking space may be transmitted from the portable electronic device to the server. The server may provide back-up storage of the data to allow recovery of the data in the event of a failure of the portable electronic device. The data transmitted between the portable electronic device and the server may include the received encoded data, the processed data, or a combination of both. The data stored by the server may include the received encoded data, the processed data, or a combination of both. The server may perform processing of the encoded data. The portable electronic device may be communicatively coupled with the server over any suitable communications path, such as a wireless signal or a cellular signal.

The stored data may be accessed by the server in response to a request to retrieve the stored data. The person may request retrieval of the stored data in the event of a failure of the portable electronic device. The person may also request retrieval of the stored data for any other reason wherein the person is unable to retrieve the stored data from the portable electronic device, i.e., the portable electronic device does not have to be inoperable. The request for retrieval of the stored data may come through any communications path, such as a toll free dial-in number or an internet based website. If the portable electronic device becomes operable following a failure, it may also be communicatively coupled with the server to request retrieval of the stored data and display it for the person.

The system implementing the method in accordance with exemplary embodiments may have components or modules associated with the portable electronic device to complete the steps of the method detailed above, such as receiving and processing of the data from the computer readable media associated with the parking space. The portable electronic device may also have communications capability to be communicatively coupled over a suitable path with a server to transmit the data. The portable electronic device may contain one or more processors. The one or more processors may be dedicated to the processing of the data or the one or more processors may be shared with other modules contained in the portable electronic device. The modules on the portable electronic device may include a data input module, an erasing module, a decoding module, a storage module, a display module, a transmit/receive module, a user interface module, and a payment module. Each module may perform a step or a series of steps involved in the processing of data associated with a parking space.

Referring to FIG. 1A, a block diagram of a system architecture for receiving and processing the location of a parking space is shown in accordance with an exemplary embodiment. The system may include, among other things, a parking space 100, encoded data 102 associated with the parking space 100, a portable electronic device 104, a server 110, and storage 112. Communications paths 106 and 108 may provide connectivity between portable electronic device 104 and the encoded data 102 and the server 110, respectively. Other various network components and embodiments may also be provided.

The parking space 100 may be a single parking space located within a parking area. Parking area refers to, but is not limited, to a parking structure such as a parking garage or a parking lot containing one or more levels and multiple parking spaces for automobiles. The parking area may be located anywhere, such as at a large office building, business, shopping mall, or airport. The parking area may contain at least a single parking space. The parking area may also be street parking, either on or off street.

The parking space 100 may be a parking space for automobiles. Automobile refers to, but is not limited to a car, truck, motorcycle, moped, or mobile home. In other words, automobile includes all types of powered vehicles which may be driven by a person and may be parked within a parking space.

The encoded data 102 associated with a parking space may be located on or adjacent to parking space 100. The encoded data 102 may be affixed to the parking space 100 in a suitable manner. For example, the encoded data may be affixed to the parking curb at the head of the parking space, to the parking space, or to the structure surrounding the parking space, such as a railing or column. In some embodiments the code may be affixed to a parking meter for the parking space, such as a parking meter for a parking space on a road or street. The encoded data 102 may be affixed in a manner to allow the person to find the encoded data. Multiple copies of the encoded data 102 may be associated with the parking space 100 to allow the person to choose which encoded data 102 to use.

The encoded data 102, which is associated with the parking space 100, may be contained upon or within a computer readable media. The computer readable media may be readable by the portable electronic device 104. For example, the encoded data 102 may be a bar code, a dot matrix code or any other suitable code that is readable by the portable electronic device 104. The encoded data 102 may be unique to parking space 100. The encoded data 102 may contain data about the parking space, such as the location of the parking space within the parking area. In addition, the encoded data may include parking rate information, i.e., an hourly cost to park in that parking space. Other data may be included as required, such as a physical or street address of the parking area and the hours of operation of the parking area.

FIG. 2A-2C depicts various types of encoded data 102 according to an exemplary embodiment. In one embodiment, as depicted in FIG. 2A, the encoded data 102 may be a one dimensional barcode 202. For example, these may include a variety of one-dimensional barcodes, such as Code 39, Code 93, Code 128, UPC, EAN, JAN, Interleaved 2 of 5, Code 11, Codabar, MSI Plessey, RSS Family, etc. In another embodiment, as depicted in FIG. 2B, the encoded data 102 may be a two-dimensional barcode 204, which may include, for example, PDF 417, QR Code, Data Matrix, Maxicode, MicroPDF417, Micro QR Code, Codablock, Composite, etc. In yet another embodiment, as depicted in FIG. 2C, the encoded data 102 may include a postal code 206. For example, these may include various postal codes, such as Postnet, Planet, UPU, USPS 4CB, Australia Post, Japanese Post, Royal Mail RMaSCC, K IX Code, etc. Other various encoded data 102 may also be provided in forms readable by the portable electronic device 104.

In some embodiments, the encoded data 102 may be provided by an RFID chip. The RFID chip may be read by an RFID reader. The RFID reader may be associated with the portable electronic device 104. The RFID chip may contain the same data that the other forms of encoded data 102 contain, e.g., the location of the parking space 100.

The portable electronic device 104 may be any portable electronic device capable of receiving and decoding the encoded data 102. In one embodiment, the portable electronic device 104 may consist of a cell phone or another mobile communication device, such as a personal digital assistant (PDA), a smart phone, or a Blackberry.

The portable electronic device 104 may be configured to receive the encoded data 102 associated with the parking space 100. For example, the portable electronic device 104 may have a digital imaging device, such as a digital camera or an optical scanner. The digital imaging device may be contained within or be communicatively coupled to the portable electronic device 104. The portable electronic device 104 may have an RFID reader. The RFID reader may be configured to receive the encoded data 102 from the RFID chip. The RFID reader may be contained within or be communicatively coupled to the portable electronic device 104.

The portable electronic device 104 may receive encoded data 102 over the communications path 106. The communications path 106 may be any suitable path through which the portable electronic device 104 may be communicatively coupled with the encoded data 104. In some embodiments, the communications path 106 may be through optical imaging, such as through a digital camera. For example, the portable electronic device 104 may receive the digital image of encoded data 102 through an optical imaging device, such as a digital camera. In other embodiments, the communications path 106 may be a radio-frequency based path, such as RFID. For example, the portable electronic device 104 may contain an RFID reader to receive an RFID signal from an RFID chip containing the encoded data 102.

After the encoded data 102 is received by the personal electronic device 104, the data contained within the encoded data 102 may be decoded. For example, the encoded data 102 may be decoded from a machine readable format to a human readable format. The personal electronic device 104 may have a decoding module for decoding the data contained within encoded data 102. The decoding module may be a processor.

Once the data contained within encoded data 102 is decoded by the portable electronic device 104, the decoded data may be displayed by the portable electronic device 104. The displayed data may include the location of the parking space 100. A time of receipt for the encoded data 102 may also be displayed. The time may originate from the portable electronic device's own clock. In some embodiments, parking rate information may also be displayed. Using the time the encoded data 102 was received and the parking rate information, the parking cost may be calculated. The parking cost may be automatically computed for the user in the form of a running total. The parking cost may be an estimate of the total cost, for example, showing the parking cost for different times to leave the parking space based upon the time of parking.

The portable electronic device 104 may automatically initiate communications with a server 110. The communications may be initiated upon decoding the encoded data 102. The portable electronic device 104 may also initiate contact with the server 110 through a manual command from the user of the portable electronic device 104. Such a command may be entered or selected on the portable electronic device 104. Upon successful initiation of communications between the portable electronic device 104 and the server 110, the portable electronic device 104 may be communicatively coupled with the server 110 over communications path 108. Data may be exchanged between the portable electronic device 104 and the server 110. Data may be transmitted from the portable electronic device 104 to the server 110. Data may be transmitted from the server 110 to the portable electronic device 104.

The data transmission over path 108 may be in the form of a text message or an email. The data from portable electronic device 104 may include the decoded data from the encoded data 102. In some embodiments, the encoded data 102 may be transmitted to the server 110. Alternatively, a combination of both the decoded data and the encoded data 102 may be transmitted to the server 110. The server 110 may perform processing of the data received from the portable electronic device 104, such as decoding the encoded data 102. The server 110 may associate the data with the particular portable electronic device 104 that transmitted the data. The association may be done by using, for example, the phone number of the portable electronic device 104, the email address of the portable electronic device 104, the Internet Protocol (IP) address of the portable electronic device 104, or a combination thereof. The association of the data may be by any identifier that uniquely identifies the portable electronic device 104 that transmitted the parking space data. The association of the data with the portable electronic device 104 may allow for future access, retrieval, and processing of the data.

The communications path 108 may be any suitable communications path, such as a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device 104 to the server 110. The portable electronic device 104 and the server 110 may use standard wireless protocols including IEEE 802.11a, 802.11b and 802.11g. The communications path 108 may also consist of the portable electronic device 104 placing a cellular call to the server 110, in which case communications path 108 takes place over the appropriate cellular network which serves the portable electronic device 104 and the server 110.

The server 110 may send an acknowledgement to the portable electronic device 104 over the communications path 108 upon completion of the data transmission. The receipt may indicate if the transmission was successful. The receipt may be displayed upon the portable electronic device 104 for the user to review. The receipt may also consist of an audible tone or message, such as a text message or an electronic mail message.

In some embodiments, the encoded data 102 received by the portable electronic device 104 may be transmitted to the server 110. If the encoded data 102 is transmitted, the server 110 may decode the encoded data 102. The server 110 may decode the encoded data 102. The server 110 may then transmit the decoded data to the portable electronic device 104 for display to the user. The display may be in the same manner as if the portable electronic device performed the decoding and display functions. This option may be used if the portable electronic device 104 does not have the capability to decode the data itself, such as if the portable electronic device 104 is an older model lacking certain capabilities of decoding a particular form of the encoded data 102. The server 110 may also transmit the decoded data to the portable electronic device 104 in the form of a text message or electronic mail message. The decoded data transmitted from the server 110 to the portable electronic device 104 may also be stored on the portable electronic device 104.

The server 110 may store the data in storage 112. The data stored may consist of the decoded data, the encoded data, or a combination thereof. The server 110 may overwrite prior data from the portable electronic device 104 stored in storage 112. In some embodiments, an option may be presented on the portable electronic device 104 to allow the prior data stored in storage 112 to be kept along with the recent data. This option may be presented as a display choice on the portable electronic device 104 for the user to select. For example., a person may park their automobile in an airport parking area and record the encoded data 102 corresponding to the parking space 100 they parked in. Subsequently, the person may travel to another location and obtain a rental automobile. While using the rental automobile, the person may park it in a parking area and wish to use the features of the claimed invention. This feature would allow them to do this.

A form of identification may be assigned to the data received from the portable electronic device 104 associating the data with that particular electronic device, e.g. the portable electronic device 104. The identification may be unique to permit the retrieval of the data associated with the portable electronic device 104, if required, due to a failure of the portable electronic device 104. The identification may consist of the phone number, the email address, or the IP address associated with the portable electronic device 104. A combination of identification features may be used to protect access to the data stored in storage 112. In some embodiments, a user of the exemplary embodiment may create a unique password for accessing the stored data. The form of identification may be tagged to the stored data to associate the data with the portable electronic device 104.

The storage 112 may consist of any suitable storage device for the data from server 110. Storage 112 may consist of one of more data storage devices. Storage 112 may be local, remote, or a combination thereof with respect to the server 110. Storage 112 may utilize a redundant array of disks (RAID), striped disks, hot spare disks, tape, disk, or other computer accessible storage. In one or more embodiments, storage 112 may be a storage area network (SAN), an internet small computer systems interface (iSCSI) SAN, a Fibre Channel SAN, a common Internet File System (CIFS), network attached storage (NAS), or a network file system (NFS). The storage 112 may have back-up capability built-in. Communications with the server 110 may be over a network, such as a local area network or communications may be over a direct connection to server 110. Data may be transmitted and/or received from the server 110. Data transmission and receipt may utilize cabled network or telecom connections such as an Ethernet RJ45/Category 5 Ethernet connection, a fiber connection, a traditional phone wireline connection, a cable connection or other wired network connection. A wireless network may be used for the transmission and receipt of data.

The user of the portable electronic device 104 may also initiate contact with the server 110 to retrieve the data from the particular encoded data associated with the portable electronic device 104. Upon establishment of communication with the server 110, the data may be transmitted from the server 110 to the portable electronic device 104 for display to the user. The data may also be stored upon the portable electronic device 104 after it is received from the server 110. This communication may occur over the same communication path, that is the contact with the server 110 and the transmission of data from the server 110 to the portable electronic device may occur over the same communications path.

The user may initiate communications with the server 110 over a communications path 116 through an alternate communications 118. The communications path 116 may consist of any suitable communications path as described above for the communications path 108. The alternate communications 118 may be used to provide retrieval of the data stored in storage 112 by the server 110 in the event of a failure, catastrophic or otherwise, of the portable electronic device 104. The user of the portable electronic device 104 can obtain the data from the server 110 and stored in storage 112 through the alternate communications module 118. The data retrieved using this method may be in decoded form. The alternate communications 118 may be any suitable method or system providing access to the server 110. For example, a toll-free phone number or an internet based website may be used to allow the user to communicate with the server 110. The user may have to enter a code to retrieve the decoded data, such as the phone number or email address associated with the portable electronic device 104. A user created password may also be used to access and retrieve the stored data. In some embodiments, a station or location for alternate communications 118 may be provided within the parking area to give a user access to alternate communications 118. For example, the parking area with the parking space 100 may contain a computer terminal with internet access to allow access to a website to retrieve data from the storage 112 through the server 110.

Upon establishment of communications with the server 110, either through the communications path 108 or through the communications path 116 using alternate communications 118, the user may be required to provide the identification used by the server 110 to store the data in storage 112. This identification may allow the data from the portable electronic device 104 that is stored in storage 112 to be retrieved and transmitted to the user. Such identification may only be required if the communications path 116 is used since the server 110 may be able to recognize the portable electronic device 104 if communications path 108 is used. The form of the provided data may depend upon the method or system used to establish communications with the server 110. For example, if a toll free number is used to contact the server 110, the retrieved data may be relayed to the user through an audio message containing the information from the data, e.g., the location of the parking space. The server 110 may also transmit back to the portable electronic device 104 the data received from the portable electronic device 104. The data may be in encoded or decoded format. If the encoded data is transmitted to the portable electronic device 104, the portable electronic device 104 may decode the data and display the decoded data to the user. The data may also be stored on the portable electronic device 104 following receipt from the server 110.

In some embodiments, the alternate communications 118 may be a website. The communications path 116 can be the internet. Upon accessing an appropriate website, the user may provide the identification and the data may then be retrieved and displayed upon the computer being used to access the website.

In some embodiments, the parking space 100 may have a parking meter 122 associated with it. The parking meter 122 may require payment upon parking in the parking space. Typically, payment is in the form of coins deposited in the parking meter. The parking meter 122 may only limit the amount of time that can be paid for, e.g., 2 hour maximum. Some parking meters accept electronic payment methods, such as credit cards.

Figure 1B:
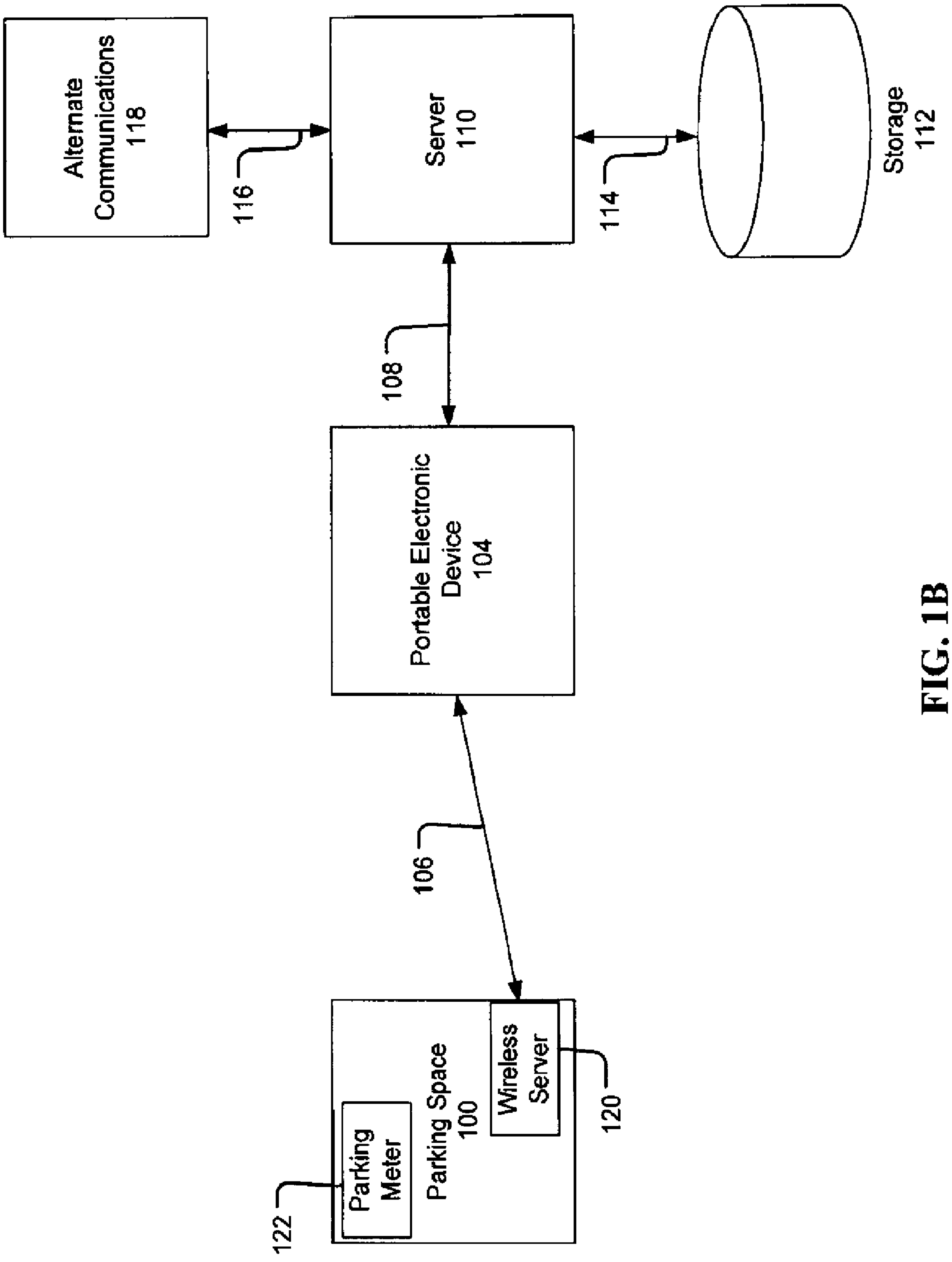
FIG. 1B depicts a block diagram of a system architecture for receiving and processing the location of a parking space in accordance with another exemplary embodiment.

FIG. 1B depicts a system architecture for receiving and processing the location of a parking space in accordance with another exemplary embodiment. In this embodiment, communications path 106 may be a wireless path. The encoded data 102 may be replaced by a wireless server 120, in other words the computer readable media is replaced by the wireless server. The wireless server 120 may comprise a computer implemented system capable of broadcasting a wireless signal containing the same or similar information as encoded data 102 from FIG. 1A. Portable electronic device 104 may have an appropriate wireless capability to interact with wireless server 120 to exchange (transmit and receive) data. The wireless server may be located at the parking space 100 or may be located remotely. A combination of both remote and local hardware may be used for the wireless server 120. For example, a wireless antenna may be located at parking space 100 and the remaining wireless hardware, such as the server, may be located remotely in the parking area.

The wireless signal used by the wireless server 120 may be a wireless broadband signal or may also consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data. The wireless server 120 may use any standard wireless protocol, including IEEE 802.11a, 802.11b and 802.11g. More than one wireless protocol and signal type may be used to cover a range of portable electronic device capabilities. The wireless signal may contain the same data that the encoded data 102 contained.

The portable electronic device 104 may display to the user an option to allow the portable electronic device to be communicatively coupled to the wireless signal from the wireless server for the parking space 100. The option may be presented to the user at any point upon entering the parking area and selecting a parking space. The display may allow the user to confirm on the portable electronic device 104 that the wireless signal is from the correct parking space, i.e., parking space 100 wherein the person has parked his or her automobile. A list of multiple spaces may be displayed. The list may consist of the nearby parking spaces from which the portable electronic device 104 may be receiving a wireless signal from. The wireless signal transmitted by the wireless server 120 associated with parking space 100 may be of sufficiently low power so as to be only be received when the portable electronic device is within the parking space 100, i.e., a short distance from the wireless transmitter, such as approximately 1 meter (about 3 feet).

Upon the communicatively coupling between the wireless server 120 and the portable electronic device 104 following the selection by the user of the parking space 100, the data pertaining to the parking space may be transmitted to the portable electronic device 104. The data may then be decoded in the same manner as discussed above for FIG. 1A.

In some embodiments, the parking space 100 may have both encoded data 102 and the wireless server 120 associated with it. In other words, the elements of FIGS. 1A and 1B may be combined. This configuration may provide flexibility to allow as many different types of portable electronic devices to receive the data associated with parking space 100. For example, some portable electronic devices may not possess wireless capability while others may not have an appropriate digital imaging device or an RFID reader.

The portable electronic device 104 may be used to pay for the parking space. A payment option may be presented to the user of the portable electronic device 104 to pay for the parking space 100 using the portable electronic device 104. The payment option may be selected by the user at anytime, but typically may be selected upon leaving the parking space 100. Upon selection of the payment option, the payment processing may be performed by a combination of the portable electronic device 104 and the server 110. Alternatively, payment may be processed by a combination of the portable electronic device 104, the wireless server 120, if present, and the server 110. An option to pay by a more conventional means for the parking space may also be provided, e.g., paying for the parking space locally by paying a parking lot attendant. In some embodiments, the person may be asked by the parking attendant if they wish to pay for the parking using the portable electronic device 104. The person may then use the portable electronic device 104 to initiate payment for the parking space. The parking lot attendant may receive an indication on a computer from the server 110 that the person has paid for the parking space or at least initiated the payment process. The person may then be allowed to exit the parking area. In other embodiments, the person may initiate the payment process through the portable electronic device 104 to the server 110. The server 110 may send an acknowledgement of the process completion to the parking lot attendant, via a computer display, with an identification number for the portable electronic device 104, such as the phone number. The person may then confirm with the parking lot attendant that the payment has been processed. Indeed, paying for the parking space upon exiting from the garage may provide the most accurate cost for the parking space because typically the parking area costs are calculated based upon the time of entering the parking area and the time of exiting the parking area, rather than the times of entering the parking space and exiting the parking space. A person may spend additional time in the parking area finding a parking space and/or upon exiting the park space while they are waiting to exit the parking space. The options presented to the user of the portable electronic device 104 may be displayed upon the portable electronic device. The options may be selected through such input devices as a keyboard, a touch screen, a trackwheel, or any other input means.

In some embodiments, the parking space 100 may have a parking meter 122 associated with it. The parking meter 122 may be a coin fed meter, an electronic meter that accepts credit cards, or another type of parking meter. The parking meter 122 may be communicatively coupled to the wireless server 120 to allow transmission and receipt of data from the portable electronic device 104. This embodiment may allow the use of the portable electronic device 104 to pay for the parking space 100 through the parking meter 122.

Figure 3:
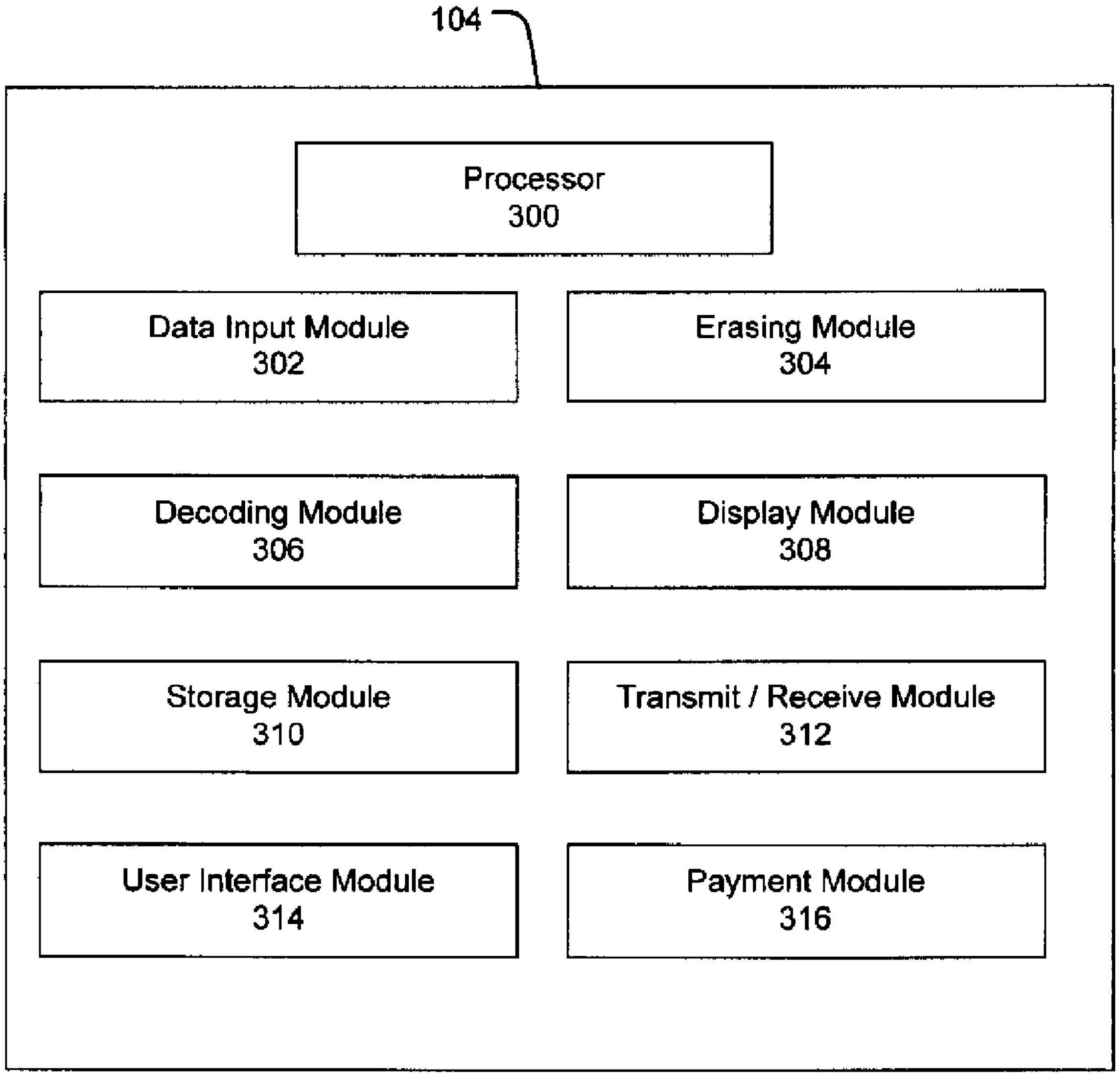
FIG. 3 depicts a block diagram of a system architecture for a personal electronic device in accordance with an exemplary embodiment.

FIG. 3 depicts a block diagram of an architecture of a portable electronic device 104 in accordance with an exemplary embodiment. This exemplary embodiment is provided by way of example, as there are a variety of architectures to implement the systems and methods described herein.

A processor 300 may be used for processing, calculating, and organizing the data. Other functions may be performed by the processor as required. One or more processors may be provided. The processor 300 is shown as a separate module in FIG. 3, however in some embodiments, the processor 300 may be a distributed processor. The processor may be distributed among the various modules shown in FIG. 3. In other embodiments, the processor 300 may be shared with other functionality within the portable electronic device.

A data input module 302 may be provided. The data input module 302 allows for the receipt of the encoded data 102. In other words, the data input module 302 may be the point through which the encoded data 102 is received at the portable electronic device 104. The data input module 302 may consist of an optical imaging device, such as a digital camera or optical scanner, or alternatively, the data input module 302 may consist of an RFID reader. In some embodiments, the data input module 302 may contain a wireless signal receiver or transceiver to receive the encoded data 102 over a wireless signal.

An erasing module 304 may be provided to implement overwrite capability for parking information previously stored within the portable electronic device 104. The erasing module 304 may erase previously stored data associated with a prior parking space, i.e., data associated with the previous parking space, that is the parking space which was used subsequent to the present parking space 100. The erasing module may erase the prior data upon receipt of new data in portable electronic device 104. The erasing module 304 may also have an option allowing the user to manually erase parking space data stored with the portable electronic device 104. Safety features may also be included in erasing module 304 to prevent accidental erasure of current parking information. The safety feature may include one or more warnings to the user about erasing data. The warnings may be audio or graphical in nature. An override of the safety feature may be provided.

A decoding module 306 may decode the information received through the data input module 302. The decoding module 306 may have multiple algorithms to recognize, interpret and decode one or more different types of encoded data 102. For example, the decoding module 302 may have algorithms to decode bar codes, such as the bar codes shown in FIGS. 2A-2C. In some embodiments, the decoding module 306 may only be able to decode only a specific type of encoded data 102. In other embodiments, the decoding module 306 may have decryption capability for a wireless signal that may have the encoded data 102 also encrypted for security.

A display module 308 may display the decoded data. Displaying the decoded data may be in any suitable format, such as graphics, text or a combination thereof. The portable electronic device's display capabilities may be used. In some embodiments, an audible message may be played for the user, if the portable electronic device 104 has audio speaker capability. The audible message may contain the information from the decoded data, e.g., the parking space location. In some embodiments, the audible message may be played in addition to a graphical or text display of the decoded data.

The display module 308 may also display the encoded data 102 in the form it is received by the data input module 302. The user may have an option to display the encoded data 102 in addition to the decoded data from the decoding module 306. The display module 308 may display a message to the user of the portable electronic device 104 to acknowledge successful receipt of the encoded data 102. A message may also indicate the unsuccessful receipt of the encoded data 102. The unsuccessful message may indicate to the user that another set of the encoded data 102 must be received. The display module 308 may interface with the data input module 302 and the decoding module 306 to determine the appropriate message to display to the user of the portable electronic device 104.

A storage module 310 may also be provided. The storage module 310 may provide for storage of the recorded data, the decoded data, or a combination thereof. The storage module 310 may consist of any suitable storage hardware or firmware or a combination thereof. In some embodiments, the storage module 310 may be removable from the portable electronic device 104, such as a removable memory card.

A transmit/receive module 312 may be provided to transmit the decoded data from the portable electronic device 104 to the server 110. It may also receive information from the server 110. The decoded data from the encoded data 102 may also be transmitted to the server 110. In some embodiments, the encoded data 102 may be transmitted to the server 110. The transmit/receive module 312 may have transmit and receive capabilities separate from the other transmit/receive modules or functions of the portable electronic device. The transmit/receive module 312 may also receive data from the server 110, such as the decoded data sent to server 110. The transmit/receive module 312 may perform all the data transmit and receive associated with the parking space data. Alternatively, the transmit and receive functions may be distributed, as appropriate, to the other modules described in FIG. 3.

A user interface module 314 may provide a means for the user to interact with the portable electronic device 104 and the other modules described in FIG. 3. The user interface module 314 may provide for a suitable interface for the user, such as a graphical user interface (GUI). The capabilities of user interface module 314 may be limited by the capabilities of the personal electronic device 104. User input to the portable electronic device 104 through the user interface module 314 may be completed through such input devices as a keyboard, a touch screen, a trackwheel, or any other input means.

A payment module 316 may also be provided. The payment module 316 may provide processing of payment information for the parking space. In some embodiments, the payment module 316 may have communications capability to exchange data with the wireless server 120 and the server 110. Such communications capability may include transmitting and receiving data. The payment module 316 may also depend upon the transmit/receive module 312 for exchanging data with the server 110, or otherwise. The payment module 316 may also use security features, such as encryption, to protect payment data, such as credit card numbers, during the transmission of data.

In some embodiments, the payment module 316 may include a processor which serves as a calculator to calculate the cost of parking in a parking space based upon the parking rate information received in the encoded data 102. The calculated cost to park may then be displayed on the portable electronic device 104, through the display module 308. The calculation and display may be automatic upon receiving the encoded data 102. The calculation and display may be manually initiated by the user of the portable electronic device 104.

The calculator may allow a person to input and display the parking cost for varying amounts of parking time. The cost display may be automatically updated as time passes as long as the automobile is parked in the parking space. For example, upon parking in the parking space, the calculator display may show the minimum cost for parking; after an interval of time has passed and the cost transitions to a new rate, the calculator may display the new cost and so forth. The calculator display may be kept active on the portable electronic device's display screen or it may be closed and recalled manually at the user's discretion.

The payment module 316 may also allow the portable electronic device 104 to be used to pay for the parking space. The payment module 316 may present an option to the user regarding paying for the parking space. The user may select such an option to initiate the payment process. Upon selection of the option, the payment module 316 may be communicatively coupled with the server 110 through the transmit/receive module 312 over the communications path 108. Alternatively, the payment module 316 may be communicatively coupled with the server 110 directly over the communications path 108 using its own transmit/receive functions. Upon establishment of the communications path 108, the server 110 may retrieve the data stored in storage 112 associated with the portable electronic device 104. The server 110 may also request the portable electronic device 104 to transmit the decoded data associated with the parking space 100. Once the server 110 has the correct data, the server 110 may process the payment request. The server 110 may calculate a cost for parking in the parking space 100. The cost may be based upon the time that encoded data 102 was received by the portable electronic device 104 and the time the payment request was initiated. The server 110 may process the payment directed to a credit card number or other payment means, such as an internet based payment account, associated with the portable electronic device 104. The payment method, such as a credit card number, may be stored in storage 112. The server 110 may retrieve the payment method from storage 112. The payment method may be stored with identifying data associated the payment method with the portable electronic device 104. For example, the person may have an account with the server 110 through the portable electronic device 104's service provider. The server 110 may then use the payment information associated with that account. Alternatively, the server 110 may process the payment request by sending the amount owed to the service provider of the portable electronic device 104 for inclusion on the owner's next billing cycle for the portable electronic device 104.

In some embodiments, if different payment options are available, the person may be presented with a display to select a particular payment option for the payment of the parking space. Upon completion of the payment transaction, the server 110 may transmit a receipt or other confirmation, such as a transaction number, to the portable electronic device 104's payment module 316. The person may then display the receipt or confirmation. The receipt or confirmation may be saved on the portable electronic device 104 in the storage module 310. In some embodiments, the server 110 may also forward a receipt or confirmation through other means to the portable electronic device 104, such as a text message or an electronic mail message, which may be handled through those appropriate functions on the portable electronic device 104. A person may be asked to provide the confirmation number to the parking lot attendant upon exiting the parking area as proof of completed payment for the parking space 100.

In some embodiments, the server 110 may communicate the payment information from the portable electronic device 104 to a computer associated with the parking lot attendant. The payment information may be associated with the portable electronic device 104, such as by using the phone number or the email account of the portable electronic device 104 to uniquely identify the payment information. This transmission may allow the parking lot attendant to confirm payment for a particular person. For example, upon completion of payment, the server 110 may transmit a receipt of the payment identified by the phone number of the portable electronic device 104 to a computer located with the parking lot attendant. When the person with the portable electronic device 104 arrives at the exit from the parking area, the person may be asked by the parking lot attendant to provide the phone number of the portable electronic device 104. The parking lot attendant may then verify that payment was made and the person may exit the parking area.

The payment process may be initiated at any time by the user or at the direction of the parking lot attendant. To prevent fraud in the payment process, security measures may be required, such as the payment process may only be initiated upon exiting from the parking area when directed by the parking lot attendant. Other security measures may be implemented.

In some embodiments, the parking space 100 may use a parking meter 122 for collection of payment for parking, as depicted in FIG. 1B. The payment process may need to be completed through communication with the parking meter 122. With a parking meter, the payment process may need to be completed upon parking in the parking space 100, since typically a parking meter must be fed payment upon parking in a parking space. In many cases, a parking meter may only allow parking for a predetermined period of time by only accepting payment up to a maximum amount that corresponds to the predetermined period of time. In order to park past the predetermined period of time, additional payment may be required at the end of the predetermined period of time to gain additional time.

The parking meter 122 may be operatively coupled to the wireless server 120. The wireless server 120 may communicatively couple with the portable electronic device 104, following receipt of the encoded data 102 by the portable electronic device 104. The wireless server 120 may present payment options through the payment module 316. Such payment options may allow payment for the parking space using the parking meter 122. The encoded data 102 for the parking space 100 may contain additional data that may prompt the payment module 316 to display this option. Data may be included in the encoded data 102 for the parking rates for the parking space, such as how much specific amounts of time cost. The cost data may be displayed to the user through the display module 308 or the payment module 316. A suitable alert may be emitted from the portable electronic device 104 to get the user's attention regarding payment of the parking meter 122, such as an audio alert or a vibration of the portable electronic device. The user may select such the option to initiate the payment process. A choice may be presented asking if the user wishes to pay locally at the parking meter, such as by deposing money into the parking meter 122, or pay electronically, such as by using a credit card. Upon selection of the payment choice, the payment module 316 may be communicatively coupled with the wireless server 120 through the transmit/receive module 312 over the communications path 106. Alternatively, the payment module 316 may be communicatively coupled with the wireless server 120 directly over the communications path 106 using its own transmit/receive functions. Upon establishment of the communications path 106, the portable electronic device 104 and the parking meter 122 may begin to exchange data to complete the payment process if the electronic payment option is selected. If the local pay option is selected, no further communication may be required. The portable electronic device 104 may display an alert reminding the user to input money into the parking meter 122.

The portable electronic device 104 may transmit to the parking meter 122 the time of parking in the parking space 100. This time may be based upon the receipt of the encoded data 102. Alternatively, the parking meter 122 may receive the time of parking from the wireless server 120. This time of parking may be sent to the parking meter 122 when the wireless server 120 transmits the encoded data 102 to the portable electronic device 104. Upon receipt of the time of parking, the parking meter 122 may transmit a prompt to the portable electronic device 104. The prompt may be displayed on the portable electronic device 104. The prompt may ask the user of the portable electronic device 104 how long he or she wishes to park in the space. The prompt may alternatively ask how much money the user wishes to pay. The user may input a response to the prompt. The response may be selected from a drop down menu of pre-selected choices. The response may be manually input into the portable electronic device 104 using an appropriate input device, such as a keyboard.

The portable electronic device 104 may prompt the user to enter a credit card or debit card number into the portable electronic device 104. Additional credit card information may be required to be entered, such as the type of card and the expiration date. Upon entry of the credit card number and other information, the credit card information may be transmitted to the parking meter 122. The parking meter 122 may process the credit card payment using an appropriate transaction method for credit cards. For example, the parking meter 122 may communicate through the wireless server 120 to a central server in the parking area that may process the credit card transaction. The parking meter 122 may process the credit card transaction itself. Alternatively, the parking meter 122 may use the communications path 106 through the portable electronic device 104 to send the payment request for processing.

Upon completion of the payment transaction, a receipt or other confirmation means may be provided from the parking meter 122 to the portable electronic device 104 as a record of the payment.

In some embodiments, the parking meter 122 may have an RFID reader. The portable electronic device 104 may contain an RFID chip. The RFID chip associated with the portable electronic device 104 may be placed close to the RFID reader and the RFID chip may be read. The RFID chip in the portable electronic device may be programmed with electronic payment information, such as credit card information. The payment of the parking meter 122 may be completed in the following manner. The parking meter 122 may have a display with selectable options that allow a person to input the desired time and/or amount for payment after the RFID chip is read. The transaction may be completed as described above for a credit card. Upon completion of the transaction, the parking meter 122 may issue a receipt as a record of the transaction.

In some embodiments, the portable electronic device 104 may display an alert when and/or prior to the parking time paid for at the parking meter 122 runs out. An alert may be displayed at pre-set intervals prior to the parking time running out, such as 5 or 10 minutes prior to the expiration. The alert may be visual and/or audible. The alert may be processed and displayed through the display module 308. Alternatively, the payment module 316 may process the alerts. It should be appreciated that the alert may be displayed even if payment for the parking space 100 was made locally at the parking meter 122, such as by depositing coins or by using an RFID chip.

If the user desires to apply additional funds to the parking meter 122, an option may be displayed on the portable electronic device at or prior to the expiration of the parking time. The option may present the user a choice to add more funds to the parking meter using the same payment method. An option may be presented to change the payment method, such as changing from a credit card to paying the meter locally. It should be appreciated that other combinations are possible. In response to the option, additional funds may then be added to the parking meter to extend the parking time. The parking time may be extended up to a predetermined limit. In some embodiments, the parking time may not be able to be extended based upon the parking area rules or local and/or state regulations. The transaction request to add additional funds may be transmitted from the portable electronic device 104 to the parking meter 122 over the communications path 106 via the wireless server 120. It should be appreciated that other such communications paths may be possible if the portable electronic device 104 is out of range of the wireless server 120. The communication path 106 may comprise a cellular call from the portable electronic device to the wireless server 120 wherein the wireless server 120 may be configured to receive such a call and route the data received to the parking meter 122. Other appropriate communications paths are possible.

Upon receipt of the transaction to add additional funds to the parking meter 122, the parking meter 122 may process the transaction as described above. A receipt or other confirmation means may be provided from the parking meter 122 to the portable electronic device 104 as a record of the payment.

Figure 4:
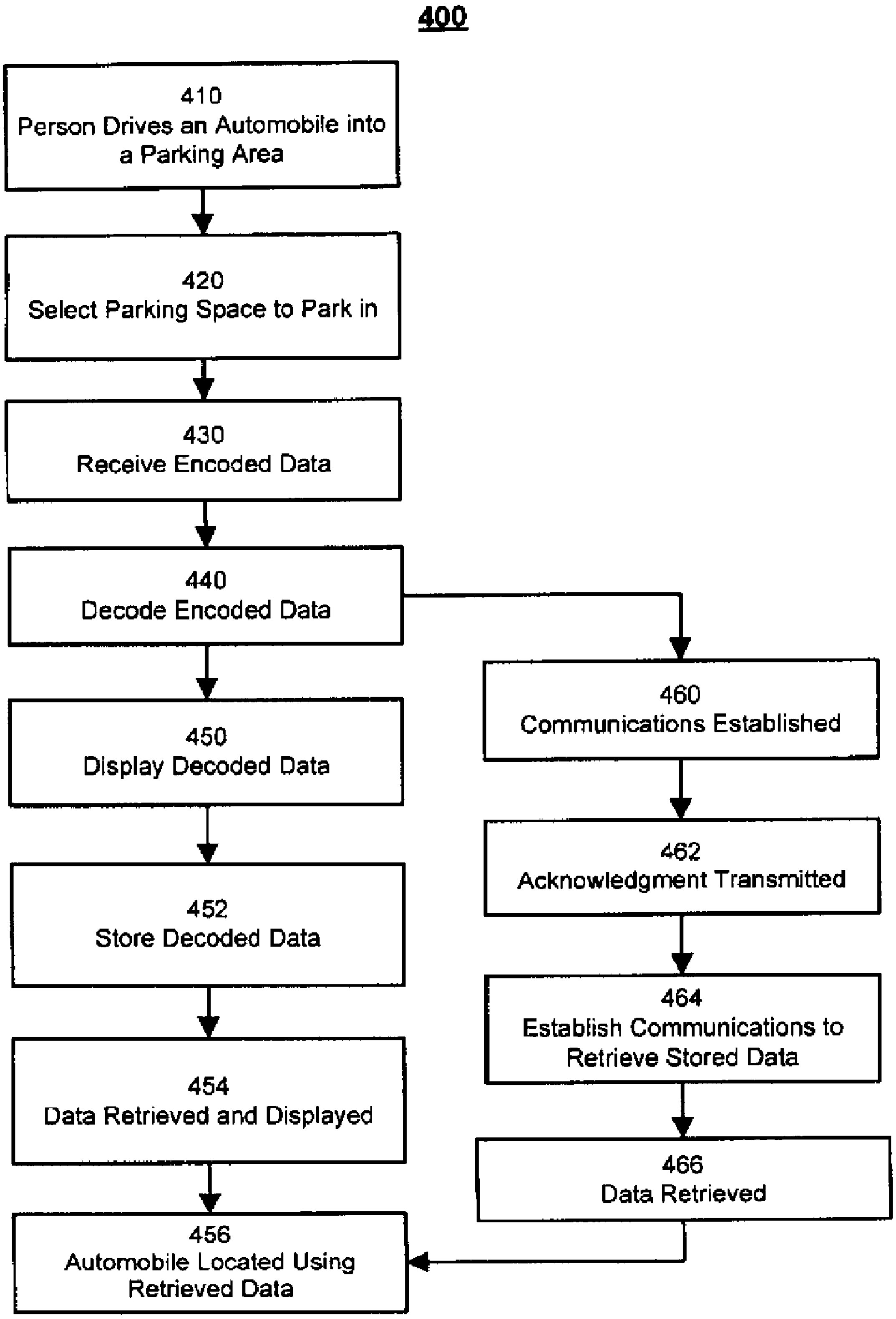
FIG. 4 depicts a flow chart of a method for recording the location of a parking space in accordance with an exemplary embodiment.

FIG. 4 depicts a flowchart of a method in accordance with an exemplary embodiment. Exemplary method 400 is provided by way of example, as there are a variety of ways to carry out the methods disclosed herein. The method 400 as shown in FIG. 4 may be executed or otherwise performed by one or a combination of various systems. The method 400 is described below as carried out on an exemplary system as shown in FIGS. 1A, 1B, and 3 by way of example, and various elements of FIGS. 1A, 1B, and 3 are referenced in explaining the exemplary method of FIG. 4. Each block shown in FIG. 4 represents one or more processes, methods, or subroutines carried out in the exemplary method 400. Referring to FIG. 4, the exemplary method 400 may begin at block 410.

At block 410, a person may enter a parking area in an automobile. The person, or user, may have a portable electronic device with them. For example, a person with a portable electronic device 104 in the form of a cell phone or a personal digital assistant (PDA) drives into a parking area at an airport in search of a parking space 100.

Continuing, at block 420, a parking space is selected to park in. The parking space may have encoded data associated with it. For example, the person parks in parking space 100. The parking space 100 may have encoded data 102, in the form of a bar code, affixed to it.

Alternatively, the parking space may have a wireless server associated with it, as shown in FIG. 1B. The wireless server may broadcast a wireless signal containing the parking space data. That is, encoded data 102 is replaced by wireless server 120. For example, a person with a portable electronic device 104 drives an automobile into a parking area that has a wireless server 120 associated with each parking space. The wireless server 120 may be located at a central location of the parking area and the wireless equipment distributed to each space through various cabling. As a result, at each parking space, a broadcast antenna may be located therein for the broadcast of the signal associated with that parking space. The portable electronic device 104 may have a wireless capability that is compatible with the wireless signal and is capable of exchanging data with the wireless server 120 in the form of communicatively coupling with the wireless signal to transmit and receive data.

At block 430, encoded data associated with the parking space is received. For example, the portable electronic device 104 may receive the encoded data associated with the parking space. The receipt of the data may be conducted by the data input module of the portable electronic device. The data input module 302 may be a digital camera, or a bar code reader, or an RFID reader. The person may use the portable electronic device 104's digital camera to take an image of the encoded data 102's bar code. Alternatively, if an RFID tag or chip is associated with the parking space, then the portable electronic device may receive the encoded data through an RFID reader associated with the portable electronic device 104. For example, the portable electronic device 104 is moved close to the RFID tag or chip and the RFID reader in the portable electronic device 104 receives the data contained within the encoded data 102.

In other embodiments, if a wireless signal is used, the portable electronic device may be communicatively coupled with the wireless server to receive the encoded data associated with the parking space, as described above. For example, the portable electronic device 104 may receive the wireless signal from the wireless server 120 over the communications path 106 through data input module 302.

A wireless signal may be received on the portable electronic device for more than the selected parking space, e.g., the parking space 100, due to the proximity of the other parking spaces to the parking space 100. The portable electronic device 104 may present a display that lists the various wireless signals from the other parking spaces received by the portable electronic device 104. The person may be prompted with an option on the display to select the correct parking space, i.e., the parking space 100 they are parked within. To aid the person in making this selection, a parking space identifier, such as a alphanumeric designator, may be displayed at the parking space, such as on a sign hanging over the parking space or painted onto the parking space itself. For example, upon parking in the parking space, the person views the display of the portable electronic device 104 and sees a list of spaces for which the cell phone is receiving wireless signals for. The person notes the sign containing the parking space identifier hanging over the parking space and selects the corresponding wireless signal using the user interface module 314. To aid in selection of the correct parking space wireless signal, each parking space's wireless signal may be named according to the space identifier on the sign to facilitate recognition and selection by the user.

Continuing, at block 440, the encoded data is decoded. For example, the portable electronic device 104 may decode the encoded data received from the encoded data 102, such as the image taken by the portable electronic device's 104 data input module 302 is processed by processor 300 and decoded by the decoding module 303. Alternatively, the wireless signal selected may be received by the data input module 302 and processed by processor 300 and decoded by the decoding module 303.

In some embodiments, the data in the wireless signal may be encoded using an encryption to prevent unauthorized receipt or manipulation of the data. The portable electronic device 104 may be capable of decoding the encrypted data. For example, the data transmitted in the wireless signal may be encrypted to prevent spoofing and the cell phone has a specific decryption algorithm to read the data. The decryption is performed by the portable electronic device 104 prior to decoding the encoded information. The decryption may be performed by the decoding module 306, the processor 300, or a combination thereof.

Two parallel sets of steps may then be carried out after block 440. In some embodiments, the steps following block 440 may be carried out sequentially.

At block 450, the decoded data may be displayed. For example, the decoded data from decoding module 302 may be displayed upon the cell phone's or PDA's LCD screen by display module 308 for the user to review. The data may be reviewed on the display and to ensure it is correct. An audible alert may be associated with the display of the data to alert the person to review the data. The alert and display of the data may also serve as an indication that the data has been successfully decoded. In some embodiments, a warning tone and message may be displayed to indicate the receiving or decoding of the data was unsuccessful. For example, the portable electronic device 104 may sound a beep of a predetermined tone or a preset sound selected by the user to alert the person that the data has been decoded. A series of beeps may be used to alert the person that an error has occurred with the data and the person should check the display for the specific error. For example, an error message may indicate that the image must be retaken of the bar code.

The display of the data may include the data decoded from encoded data 102. For example, the decoded data may consist of the location of the space. The data displayed may further comprise the address and the name of the parking area. The encoded data 102 may also be displayed. The data displayed may further consist of the time the data was recorded, e.g., the time the image was taken, which may relate to the time the person parked in the parking space. The time may be imposed upon the data by the portable electronic device 104 during the receipt of the data through the data input module 302.

Further, the data may contain parking rate information for the parking space so the cost to park in the parking space may be calculated or estimated. In some embodiments, the portable electronic device may use the payment module to compute the cost for parking in a parking space for different lengths of time based upon the decoded data. This information may be displayed for review and may be periodically updated as discussed above for payment module to provide a running total. For example, the encoded data 102 for the parking space 100 includes the cost to park in the space for different periods of time, such as $1 per hour. The display may show the initial cost for parking as $1 in this case. The display may be updated as time advances since the rate may be tied to how long the automobile is parked in the parking space 100, for example, after an hour has passed the display will show $2 and so forth. The payment module 316 may present different options to the user on the display of the portable electronic device 104 for calculating and displaying the parking costs.

At block 452, the decoded data may be stored. For example, upon decoding of the data on the portable electronic device 104, the data is stored in storage module 310. Also, any prior parking data may be overwritten by erasing module 304.

The storage may occur coincident with the display of the decoded data, or, alternatively, the storage may occur only after an action by the person of the portable electronic device 104. For example, the portable electronic device 104 may prompt the person to allow the storage of the decoded data. At this step, any prior decoded data that is stored on the portable electronic device 104 may be overwritten with the new decoded data. For example, after the data is decoded, the decoded data is written by the storage module 310 to an appropriate storage location in the portable electronic device 104, overwriting any previous parking data, as queued by the erasing module 304. The overwriting of the previous parking data may prevent confusion by the user regarding which parking space their automobile may be parking within. In some embodiments, the prior data may not be overwritten. The prior data may be needed, such as if a person has more than one automobile parked at a time. The user may be presented with an option as to whether to overwrite any prior decoded data that is stored on the portable electronic device 104.

In some embodiments, the encoded data 102 received by the portable electronic device 104 may be stored in addition to the decoded data. Upon storage of the new encoded data 102, any prior encoded data may be overwritten.

At block 454, the data is retrieved and displayed. For example, a person may be walking back to the parking area and selects the parking data on the cell phone through the user interface module 316. Upon this selection, the parking data is retrieved from the storage module 310 and is displayed by display module 308. The person may also, at this step, check the cost of parking using the payment module 316. For example, the automobile has been parked for 4 hours so the total cost is $4. The portable electronic device will display $4 using the display module 308.

At block 456, the automobile is located using the retrieved data. For example, using the displayed parking space location information retrieved from the storage module 310, the person returns to their automobile by proceeding to the appropriate level and space number as displayed upon the portable electronic device 104's display.

At block 460, communications may be established. For example, the portable electronic device 104 may establish communications with the server 110. The communication may be automatically initiated by the portable electronic device. The communication attempt may be in response to a manual selection from the person. The communication may occur over any of various means, such as through a phone number or wireless protocol. The phone number may be toll-free, that no charges may be incurred for using the phone number. For example, the portable electronic devices places a call using the transmit/receive module 312 to the server 110 using a toll-free number over communications path 108. Upon successful establishment of communications with the server, the data is transmitted from the portable electronic device. The decoded data may be transmitted. In some embodiments, the encoded data may be transmitted. For example, the portable electronic device 104 may be communicatively coupled with the server 110. The portable electronic device 104 sends and the server 110 receives the decoded data from the parking space using the transmit/receive module 312. The transmission may be conducted over the communications path 108.

At block 462, an acknowledgement may be transmitted. This acknowledgement may be transmitted from the server upon successful completion of the data transfer. For example, upon completion of the data transmission from the portable electronic device 104 to the sever 110, the server 110 sends an acknowledgement to the portable electronic device 104 which is sent over communications path 108 and received by the transmit/receive module 312. Upon receipt of the acknowledgement, the portable electronic device 104 may display, using the display module 308, a message indicating successful transmission and may sound an audible beep using a predetermined or preselected tone. In some embodiments, only a message or a audible sound may be used.

At block 464, communications may be established to retrieve the stored data. The person may have to retrieve the stored data because of the inability to use the portable electronic device 104 to retrieve and display the data. For example, the battery of the portable electronic device 104 may be dead from lack of charge. As a result, the person may be unable to use the portable electronic device 104 to retrieve and display the stored, parking space location data. The person may then use the alternate communications 118, such as a toll free dial in phone number or a website, to establish the communications path 116 with the server 110. For example, the parking area may have a computer terminal provided for this purpose that allows the person to access a website connected to the server 110.

At block 466, the data may be retrieved. For example, the data may be retrieved from the server 110 and transmitted from the server 110. The data may be transmitted following the person entering the appropriate identification number or code which allows the server to retrieve the data stored in storage. Once the data is retrieved by the server, it may be transmitted to the portable electronic device 104. The transmitted data may be in an audio or visual format, depending upon the method used to make the request to the server. For example, the person may have used a website as alternate communications 118 using the internet as the communication path 116 to access the server 110. The website may prompt the person to enter the identification code, such as the phone number for the portable electronic device 104. Upon entering of the phone number, the server 110 may access storage 112 to retrieve the appropriate stored data associated with the portable electronic device 104. Upon successful retrieval of the data, the server 110 may transmit the data over the communications path 116 to the website for display on the computer screen to the user.

Upon receiving the stored parking space data, the person may use the data to locate their automobile at block 456 as discussed above.

Figure 5:
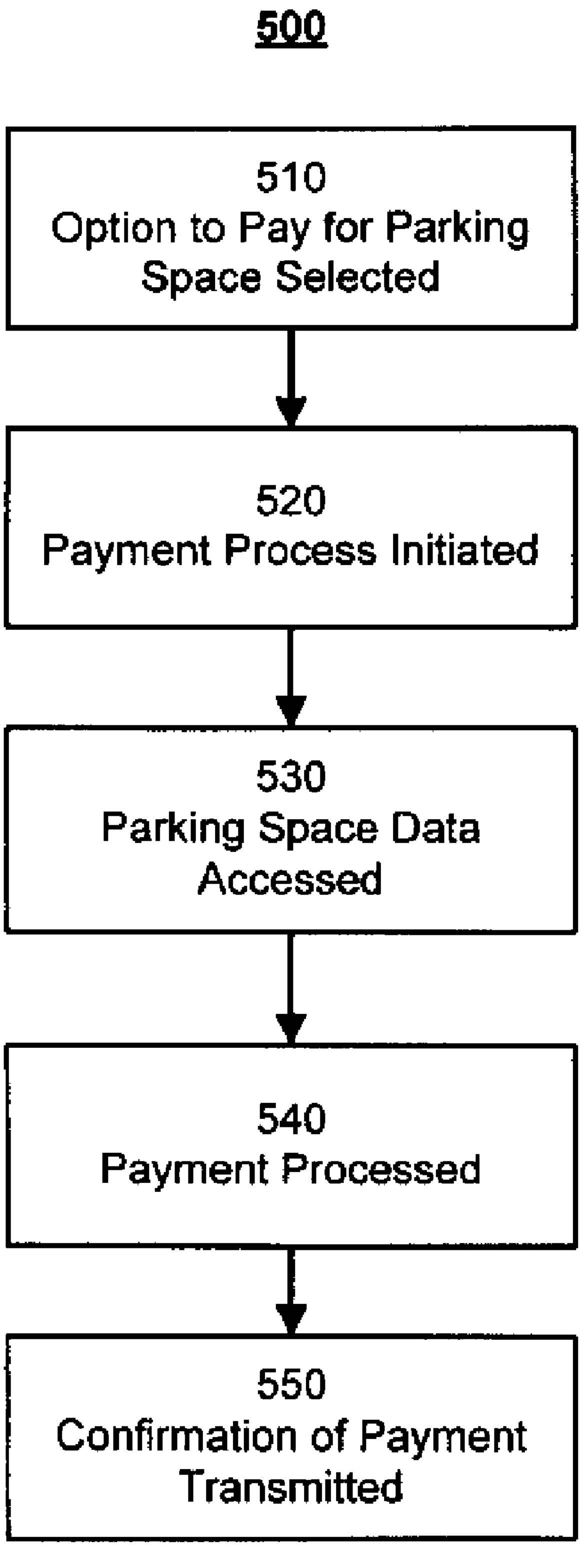
FIG. 5 depicts a flow chart of a method for completing a payment for a parking space in accordance with an exemplary embodiment.

FIG. 5 depicts a flowchart of a method in accordance with another exemplary embodiment. Exemplary method 500 is provided by way of example, as there are a variety of way to carry out methods disclosed herein. The method 500 as shown in FIG. 5 may be executed or otherwise performed by one or a combination of various systems. The method 500 is described below as carried out on an exemplary system as shown in FIGS. 1A, 1B and 3 by way of example, and various elements of FIGS. 1A, 1B and 3 are referenced in explaining the example method of FIG. 5. Each block shown in FIG. 5 represents one or more processes, methods, or subroutines carried out in the exemplary method 500. Referring to FIG. 5, the exemplary method 500 may begin at block 510.

At block 510, an option to pay for the parking space may be selected. For example, upon return to the parking space, the person may select an option to use the portable electronic device 104 to pay for the parking space. The option to pay using the portable electronic device may not be available or accessible in all embodiments. The person may select the option, from the display of the portable electronic device 104 using the user interface module 314, to pay for the parking space using the portable electronic device 104. The selection of the option to pay may invoke the use of the payment module 316.

At block 520, the payment process is initiated. The payment process may be initiated upon selection of the option in block 510. For example, the portable electronic device 104 may send a cellular signal to the server 110 requesting processing of the payment for the parking space 100.

At block 530, the parking space data is accessed. For example, the server 110 may access the data stored in storage at the server. Alternatively, the server may request and retrieve the parking data from the portable electronic device. For example, the server 110 may access and may retrieve the data stored in storage 112 associated with the portable electronic device 104 for the parking space 100. The data stored in storage 112 may be the decoded data the portable electronic device 104 transmitted to the server 110 for back-up storage.

Continuing, at block 540, the payment is processed. The server 110 may process the payment for the parking space. The server may process the payment by calculating the time the automobile was parked in the parking space. This time may be based upon both the time the parking space data was initially received and the time the payment request was sent. For example, the encoded data 102 was received by the portable electronic device 104 at 1:00 pm from the parking space 100. The payment request was sent at 4:00 pm. Therefore, the server 110 may calculate a time of 3 hours for parking in the parking space 100.

In addition to the time, the server may also require the parking rates for the parking area. The rates may be included with the parking location data that was retrieved by the server. Alternatively, the server may process the location the of the portable electronic device and associate the location with a known parking garage. The server may have access to the rate information for a variety of parking garages stored in storage. With the rates and the time of parking, the server may calculate the total cost of parking. For example, the server 110 may retrieve the rate information from the decoded data transmitted from the portable electronic device 104.

The server may also require a payment method to process the payment request. The payment information, such as a credit card number, may be stored at the server. The payment information may be associated with a particular portable electronic device. For example, the person may have a credit card number associated with the portable electronic device 104 on file with the server 110 to be used for payment of parking space charges. In some embodiments, the server 110 may process and send a payment amount to the service provider for the portable electronic device 104. The payment information may then be provided on the next bill sent to the owner of the portable electronic device 104.

At block 550, a confirmation of payment is transmitted. Following the processing of the payment, the server 110 may send a suitable confirmation of payment to the portable electronic device 104, such as a receipt or confirmation number The receipt may be transmitted to the portable electronic device in the form of electronic data, a text message, an email, or a combination thereof. The receipt may be stored on the portable electronic device. Previous receipts may be erased, either by the user or automatically. The receipt or confirmation number may also be sent to a parking lot attendant, via a computer, as proof of payment for the portable electronic device 104. The receipt may have an identifying number associating it with the portable electronic device 104, such as the phone number or email address of the portable electronic device. For example, upon completion of payment processing by the server 110, a receipt is sent in the form of a text message to the portable electronic device 104. The person may display the text message and review it. The text message may be stored using the storage module 310 on the portable electronic device 104. Additionally, a electronic receipt may be forwarded to the parking lot attendant at the parking area. The receipt may have the phone number of the portable electronic device on it. Upon arriving at the exit to the parking area, the person may be asked by the parking lot attendant to provide the phone number of the portable electronic device 104 used for payment. Once confirmation of payment is made, the person may be allowed to exit the parking area.

In some embodiments, a warning tone may be audibly emitted from the portable electronic device 104 if the person tries to erase or edit the data on the portable electronic device without paying. The person may not be allowed to erase any parking data prior to choosing a payment option. A warning tone may also be emitted if the payment request and processing, at any step is not successful.

In some embodiments, an option may be selected on the portable electronic device to allow a person to pay for the parking space locally, at the parking area, such as by paying a parking attendant or using a payment machine associated with the parking area as known in the art.

In other embodiments, security features may be provided to prevent payment fraud, such as a person paying for the parking space immediately after parking. The payment option may only be available after the parking lot attendant provides a security code to the person to enter onto the portable electronic device to enable the process. The payment option may also be initiated once the person is at the exit to the parking area upon arrival at the payment booth with the parking lot attendant. This and other security features may be used.

Figure 6:
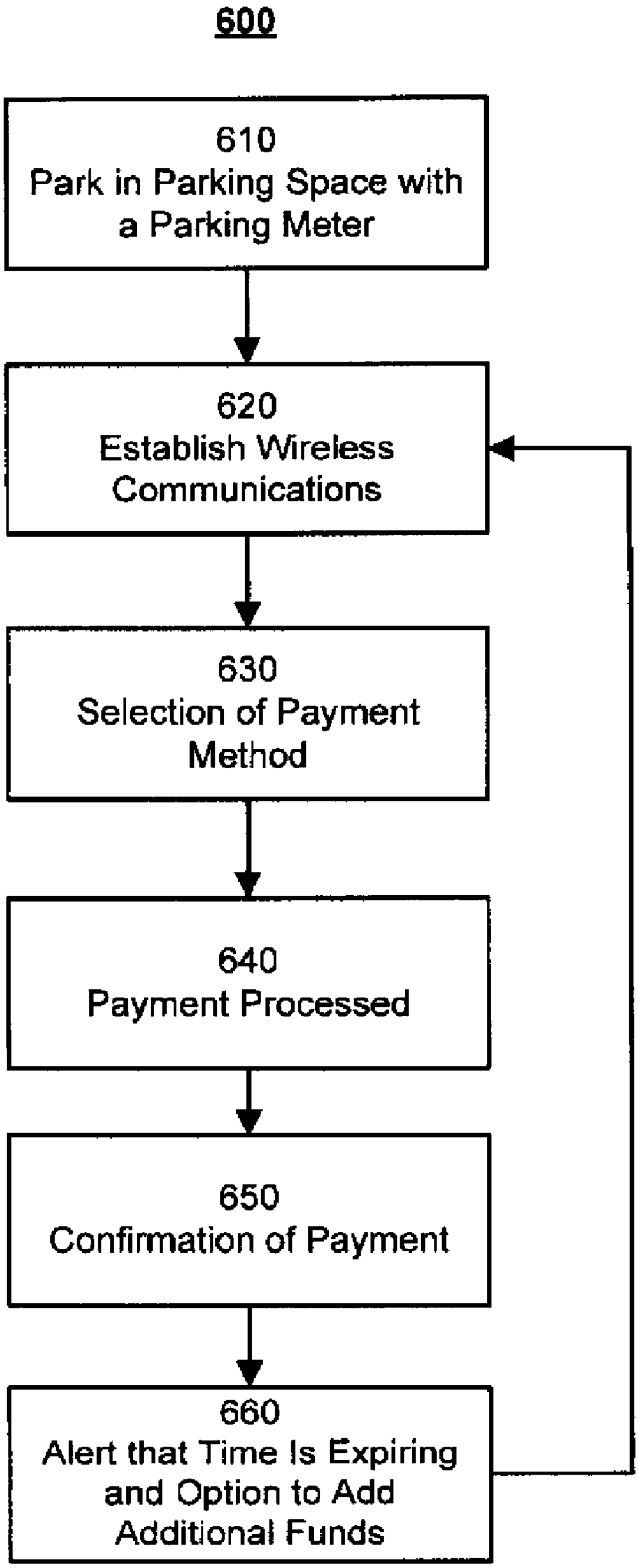
FIG. 6 depicts a flow chart of a method for completing a payment for a parking space using a parking meter in accordance with an exemplary embodiment.

FIG. 6 depicts a flowchart of a method in accordance with another exemplary embodiment. Exemplary method 600 is provided by way of example, as there are a variety of way to carry out methods disclosed herein. The method 600 as shown in FIG. 5 may be executed or otherwise performed by one or a combination of various systems. The method 600 is described below as carried out on an exemplary system as shown in FIGS. 1A, 1B and 3 by way of example, and various elements of FIGS. 1A, 1B, 3, and 4 are referenced in explaining the example method of FIG. 6. Each block shown in FIG. 6 represents one or more processes, methods, or subroutines carried out in the exemplary method 600. Referring to FIG. 6, the exemplary method 600 may begin at block 610.

At block 610, a parking space is parked in that has a parking meter. The parking space 100 may use a parking meter 122 for collection of payment for parking, as depicted in FIG. 1B. The payment process may need to be completed through communication with the parking meter 122.

At block 620, wireless communications are established. For example, the portable electronic device 104 may communicate with the wireless server 120 for the parking space 100. The parking meter 122 may be connected to the wireless server 120. This communication may enable the wireless server 120 to communication payment options to the portable electronic device 104.

At block 630, the payment method is selected. For example, the payment module 316 may present an option to the user regarding paying for the parking space via the parking meter 122. The encoded data 102 for the parking space 100 may contain additional data that may prompt the payment module 316 to display this option. Data may be included in the encoded data 102 for the parking rates for the parking space, such as how much specific amounts of time cost. The cost data may be displayed to the user through the display module 308 or the payment module 316. A suitable audio alert may be sounded on the portable electronic device 104 to get the user's attention regarding payment of the parking meter 122. The user may be prompted to pay locally at the parking meter, such as by depositing money into the parking meter 122, or pay electronically, such as by using a credit card. Upon selection of the payment choice, the payment module 316 may be communicatively coupled with the wireless server 120 through the transmit/receive module 312 over the communications path 106. Alternatively, the payment module 316 may be communicatively coupled with the wireless server 120 directly over the communications path 106 using its own transmit/receive functions. Upon establishment of the communications path 106, the portable electronic device 104 and the parking meter 122 may begin to exchange data to complete the payment process if the electronic payment option is selected. If the local pay option is selected, no further communication may be required. The portable electronic device 104 may display an alert reminding the user to input money into the parking meter 122.

The portable electronic device 104 may transmit to the parking meter 122 the time of parking in the parking space 100. This time may be based upon the receipt of the encoded data 102. Alternatively, the parking meter 122 may receive the time of parking from the wireless server 120. This time of parking may be sent to the parking meter 122 when the wireless server 120 transmits the encoded data 102 to the portable electronic device 104.

At block 640, the payment is processed. A selection of payment amount and transaction type may be made prior to the payment processing. Upon receipt of the time of parking, the parking meter 122 may transmit to the portable electronic device 104 a prompt. The prompt may be displayed on the portable electronic device 104. The prompt may ask the user of the portable electronic device 104 how long he or she wishes to park in the space. The prompt may alternatively ask how much money the user wishes to pay. The user may input a response to the prompt. The response may be selected from a drop down menu of pre-selected choices. The response may be manually input into the portable electronic device 104 using an appropriate input device, such as a keyboard or a touchscreen pad.

The portable electronic device 104 may then prompt the user to enter a credit card or debit card number into the portable electronic device 104. Upon entry of the credit card number, the credit card number may be transmitted to the parking meter 122. The parking meter 122 may process the payment onto the credit card using an appropriate transaction method for credit cards. For example, the parking meter 122 may communicate through the wireless server 120 to a central server in the parking area that may process the credit card transaction. The parking meter 122 may process the credit card transaction itself. Alternatively, the parking meter 122 may use the communications path 106 through the portable electronic device 104 to send the payment request for processing.

At block 650, a confirmation of payment may be provided. The confirmation or receipt of payment may be provided from the parking meter 122 to the portable electronic device 104 as a record of the payment upon completion of the payment transaction. The receipt may be displayed on the portable electronic device 104. An option may be presented to save the receipt in the storage module 310.

At block 660, an alert that time is expiring along with an option to add additional funds is presented. For example, the portable electronic device 104 may display an alert when or prior to the parking time paid for at the parking meter 122 runs out. An alert may be displayed at pre-set intervals prior the parking time running out, such as five or ten minutes prior to the expiration. The alert may be visual and/or audible. The alert may be processed and displayed through the display module 308. Alternatively, the payment module 316 may process the alerts. It should be appreciated that the alert may be displayed even if the funds have been deposited locally into the parking meter 122, e.g., coins were put into the parking meter 122 instead of paying electronically by a credit card.

If the user desires to put additional funds into the parking meter 122, the method described above, commencing with block 620 may be repeated. An option may be displayed on the portable electronic device at the expiration of the parking time. The option may be displayed prior to the expiration of the parking time. The option may present the user a choice to add more funds to the parking meter using the same payment method. An option may be presented to change the payment method, such as changing from a credit card to paying the meter locally. Additional funds may then be added to the parking meter to extend the parking time. The parking time may be extended up to a predetermined limit. In some embodiments, the parking time may not be able to be extended based upon the parking area rules or local and/or state regulations. In such cases, an appropriate warning may be displayed on the portable electronic device 104. The transaction request to add additional funds may be transmitted from the portable electronic device 104 to the parking meter 122 over the communications path 106 via the wireless server 120. It should be appreciated that other such communications paths may be possible if the portable electronic device 104 is out of range of the wireless server 120. The communication path 106 may comprise a cellular call from the portable electronic device to the wireless server 120 wherein the wireless server 120 may be configured to receive such a call and route the data received to the parking meter 122. Other appropriate communications paths are possible.

Upon receipt of the transaction to add additional funds to the parking meter 122, the parking meter 122 may process the transaction as described above in blocks 620 through 650. A receipt or other confirmation means may be provided from the parking meter 122 to the portable electronic device 104 as a record of the payment. The process may be repeated as many times as required while the parking space is in use. It should be appreciated, the limits may be placed upon the amount of time the parking space 100 may be used.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:

receiving, at a portable electronic device, encoded data associated with a parking space;

generating, at the portable electronic device, information associated with the parking space using the encoded data; and displaying, at the portable electronic device, the information associated with the parking space, wherein the portable electronic device is configured to transmit a process payment request to a server and to receive a confirmation of payment from the server.

2. The method of claim 1, wherein the encoded data comprises at least one of the location of the parking space and the parking rate information for the parking space.

3. The method of claim 1, wherein the encoded data is stored on a computer readable medium comprising at least one of a bar code, a dot matrix code, and an RFID chip.

4. The method of claim 1, wherein the portable electronic device comprises at least one of a mobile phone, a personal digital assistant, and a handheld computing device.

5. The method of claim 1, wherein the encoded data is received as a digital image.

6. A computer readable medium comprising code which when executed causes a computer processor to perform the method of claim 1.

7. An apparatus, comprising:
at least one processor;
a data input module comprising at least one of an optical imaging device, wherein the data input module is configured to receive data associated with a parking space;
a user interface module configured to allow a user to view the data; and
a transceiver module configured to receive and transmit data with a server, wherein the server is configured to process payment requests and to transmit a payment confirmation.

8. The apparatus of claim 7, further comprising:
a display module configured to display data;
a storage module configured to store data; and
an erasing module configured to erase previously stored parking data.

9. The apparatus of claim 7, wherein the apparatus is at least one of a mobile phone, a personal digital assistant, and a handheld computing device.

10. The system of claim 7, wherein the data associated with the parking space comprises at least one of a bar code, a dot matrix code, and an RFID transmission.

11. A system, comprising:
a server configured to receive and transmit data associated with a location of a parking space, and to process payment requests from the portable electronic device for the parking space and transmit a confirmation of payment therefore to at least the portable electronic device, wherein the server is further configured to decode encoded data received from the portable electronic device, and wherein the encoded data comprises at least one of a bar code, a dot matrix code, and an RFID transmission.

12. The system of claim 11, wherein the server is further configured to:
respond to a query transmitted from the portable electronic device;
retrieve data responsive to the query; and
transmit the data for display at the portable electronic device.

13. The system of claim 11, further comprising:
a storage device communicatively coupled to the server wherein the storage device at least stores data received by the server from the portable electronic device.

14. The system of claim 11, wherein the data associated with the location of a parking space further comprises parking rate information for the parking space.

15. A method, comprising:
receiving data, at a server from a portable electronic device, associated with a location of a parking space;
decoding, by the server, the data in the event the data associated with the location of the parking space is encoded, wherein the encoded data comprises at least one of a bar code, a dot matrix code, and an RFID transmission; and
processing and allocating, by the server, parking space occupancy for the parking space.

16. The method of claim 15, further comprising:
processing at least one payment request from the portable electronic device for the parking space; and
transmitting a confirmation of payment therefore to at least the portable electronic device.

17. The method of claim 1, further comprising:
responding, by the server, to a query transmitted from the portable electronic device;
retrieving, by the server, data responsive to the query; and
transmitting, by the server, the data for display at the portable electronic device.

18. A computer readable medium comprising code which when executed causes a computer processor to perform the method of claim 15.

* * * * *